United States Patent [19]
Berg

[11] 4,081,760
[45] Mar. 28, 1978

[54] ETALON LASER MODE SELECTOR

[75] Inventor: Anthony D. Berg, Los Altos, Calif.

[73] Assignee: Coherent, Inc., Palo Alto, Calif.

[21] Appl. No.: 692,537

[22] Filed: Jun. 3, 1976

[51] Int. Cl.$^2$ ............... H01S 3/082; H01S 3/086; H01S 3/10

[52] U.S. Cl. ............ 331/94.5 C; 331/94.5 K; 331/94.5 L; 331/94.5 M; 356/112

[58] Field of Search ........ 356/112; 331/94.5C, 94.5D, 94.5G, 94.5K, 94.5L, 94.5M, 94.5S

[56] References Cited

U.S. PATENT DOCUMENTS 3,775,699  11/1973  Cassels ................. 356/112

OTHER PUBLICATIONS

Peterson et al., "Interferometry and Laser Control...", Applied Optics, vol. 5, No. 6, Jun. 1966, pp. 985–991. Barger et al., "Frequency Stabilization...", Applied Physics Letters, vol. 22, No. 11, Jun. 1, 1973, pp. 573–575.
Leeb, Applied Physics, vol. 6, pp. 267–272, 1975.

*Primary Examiner*—William D. Larkins
*Attorney, Agent, or Firm*—Limbach, Limbach & Sutton

[57] ABSTRACT

A Fabry-Perot etalon is mounted within the optical cavity of a laser for selecting the wavelength of the output radiation of that laser from a plurality of discrete wavelengths closely distributed about a nominal wavelength. The etalon includes a pair of closely spaced prisms mounted along the optical axis of the laser cavity with the laser beam passing therethrough. Each of the prisms has a first surface facing outwardly of the etalon and inclined at a slight angle to a normal to the optical axis, and each prism includes a second surface opticaly adjacent and spaced from the second surface of the other prism, each such second surface being inclined relative to its respective first surface.

9 Claims, 2 Drawing Figures

ETALON LASER MODE SELECTOR

BACKGROUND OF THE INVENTION

The instant invention relates to laser technology and more particularly, to a device for selecting a single output mode from a laser beam.

The laser is widely recognized as a source of coherent light or energy which operates at a very specific wavelength. However, lasers, such as ion lasers, actually may operate over a range of output wavelengths, referred to as the laser gain curve, centered on that specific nominal wavelength. For example, a helium-neon (HeNe) laser operating nominally at 6328 angstroms (A) actually may operate anywhere within a gain curve having a frequency spread of approximately 1.5 Ghz, or 0.02 A about the center point of the 6328 A nominal wavelength. Since the laser cavity is a type of Fabry-Perot interferometer, the energy output is not a continuum as suggested by the gain curve, but includes a number of frequency pass bands, termed axial modes, defined by the mirror spacing in the cavity. Specifically, the pass bands are separated by $c/2 l$, where $c$ equals the speed of light and $l$ equals the mirror spacing in the laser cavity. For example, for a one meter long cavity, the pass bands are separated by 150 Mhz. Accordingly, the actual laser output may be represented as a distribution of numerous discrete wavelengths, each separated from the next by such a pass band and the total number of output wavelengths distributed over the entire laser operating gain curve. For example, in an HeNe laser having an operating frequency spread of 1.5 Ghz and a one meter optical cavity, there are approximately 10 separate lines of output radiation separated by the 150 Mhz pass band spacing.

While, for many applications the use of laser output radiation having such a described frequency spectrum is satisfactory, a number of other applications, such as high resolution spectroscopy and holography, require much narrower frequency distributions. This need for narrowing the output frequency spectrum has become particularly acute with the development of the broad band, tunable dye laser. Such dye lasers are capable of operation over a relatively broad range of output wavelengths and require, for maximum usefulness, some means for reducing the bandwidth of the output, preferably to a single axial mode. It is also desirable that means be provided for selecting such a single axial mode at any point within the full frequency spectrum of the laser output. This function conventionally is performed by the use of an optical element known as a Fabry-Perot etalon. In the prior art, the types of etalon known include the solid type comprising a block of glass or other similar optical material having opposite faces accurately parallel to one another, and the air- or gas-spaced type. In either of these types of etalons, the structure includes two accurately parallel surfaces inclined very slightly to a normal to the optical path and through which the optical path passes. The etalon parallel surfaces are appropriately spaced to form a resonant cavity therebetween, such that certain frequencies of the beam energy are transmitted through the etalon, while others are internally reflected by the etalon surfaces off the laser cavity optical axis and thus out of the beam passing through the etalon.

When etalons are tilted, as is necessary to prevent them from coupling energy back within the laser cavity themselves, the inherent multiple internal reflections cause "walk-off" losses in the beam, as described in "Losses Introduced by Tilting Intra-Cavity Etalons" by Walter R. Leeb, Applied Physics 6, 267–72 (1975), and references cited therein. The well known thick, solid etalon, because of its uniform index of refraction and relatively great spacing between the reflective surfaces, has been found to have low walk-off losses but also possess no means for rapid variation of the spacing between the reflective surfaces as is necessary to tune the etalon. Conventional air or gas-spaced etalons generally comprise a pair of relatively thin plate-like glass members parallel to and aligned with one another and spaced apart from one another. In the air-spaced etalon the laser beam passes through both plates, the outwardly facing surfaces of those plates being provided with an anti-reflective coating and the mutually facing surfaces of the respective plates being provided with a partially reflective coating. By varying the spacing between the plate-like members of the etalon, the wavelength of the output radiation of the laser may be readily adjusted. However, with this conventional air-spaced etalon the relatively thin plate-like members and the interposition of the air or gas space between them results in relatively large walk-off losses, such losses often being greater than is permissible for use with certain types of lasers, such as dye lasers. An improvement to the conventional air-spaced etalon is disclosed in Cassels U.S. Pat. No. 3,775,699 in which the optical elements comprise a pair of spaced prisms with the outwardly facing surfaces of those prisms inclined at Brewster's angle to avoid the necessity of using an antireflection coating on those surfaces. In this tilted prism type etalon the laser beam passes through the gap between the two prisms in a direction nearly normal to the two mutually facing surfaces of the two prisms. While the etalon as disclosed in the Cassels patent is more efficient optically than the spaced parallel plate variety, it has several major deficiencies. One serious deficiency is the substantial offset occurring between the beam entering the etalon and the beam leaving it. Further, because of the dispersion of the different wavelengths of light in the prism material, as described in the Cassels patent, the offset between the input and output beams varies with the optical wavelength. This dispersion inherent in the prisms thus requires, for efficient operation at each desired wavelength, tilting of the entire etalon to a different angle with respect to the incoming light beam, thus making necessary repeated angular adjustment of such etalon when used over a broad range of wavelengths.

SUMMARY OF THE INVENTION

It is an object of this invention to provide an etalon for selecting the wavelength of the output radiation of a laser from a plurality of discrete wavelengths closely distributed about a nominal output radiation wavelength of the laser. Another object of the invention is to provide an improved etalon whose structure eliminates the need for anti-reflection coatings and thus improves the efficiency of the laser optical system. It is a further object of the system to provide such an etalon comprising a pair of spaced prisms in which the offset displacement between the beam into the etalon and the beam out of the etalon is minimized. It is an additional object of the invention to provide such an etalon which is capable of being tuned for selection of different frequencies yet which has low walk-off losses. It is yet another object of the invention to provide such a dual prism etalon in which the effects of dispersion in the prisms are reduced to a negligible offset to provide an essentially achromatic device.

Briefly, the invention contemplates a Fabry-Perot etalon mounted within the optical cavity of a laser for selecting the wavelength of the output radiation of such laser from a plurality of discrete wavelengths closely distributed about a nominal wavelength. The etalon comprises a pair of spaced prisms mounted along the optical axis of the laser cavity with the laser beam passing therethrough, each such prism having a first surface facing outwardly of the etalon and inclined at a slight angle to a normal to the cavity optical axis, these prism first surfaces comprising the etalon reflecting surfaces which define the resonant frequency of the etalon. Each such prism also includes a second surface optically adjacent and spaced from the second surface of the other prism, each such second surface being inclined relative to its respective first surface.

BRIEF DESCRIPTION OF THE DRAWINGS

The invention having been generally described, a specific embodiment thereof will be discussed in detail with reference to the accompanying drawings in which.

DESCRIPTION OF A PREFERRED EMBODIMENT

Figure 1:
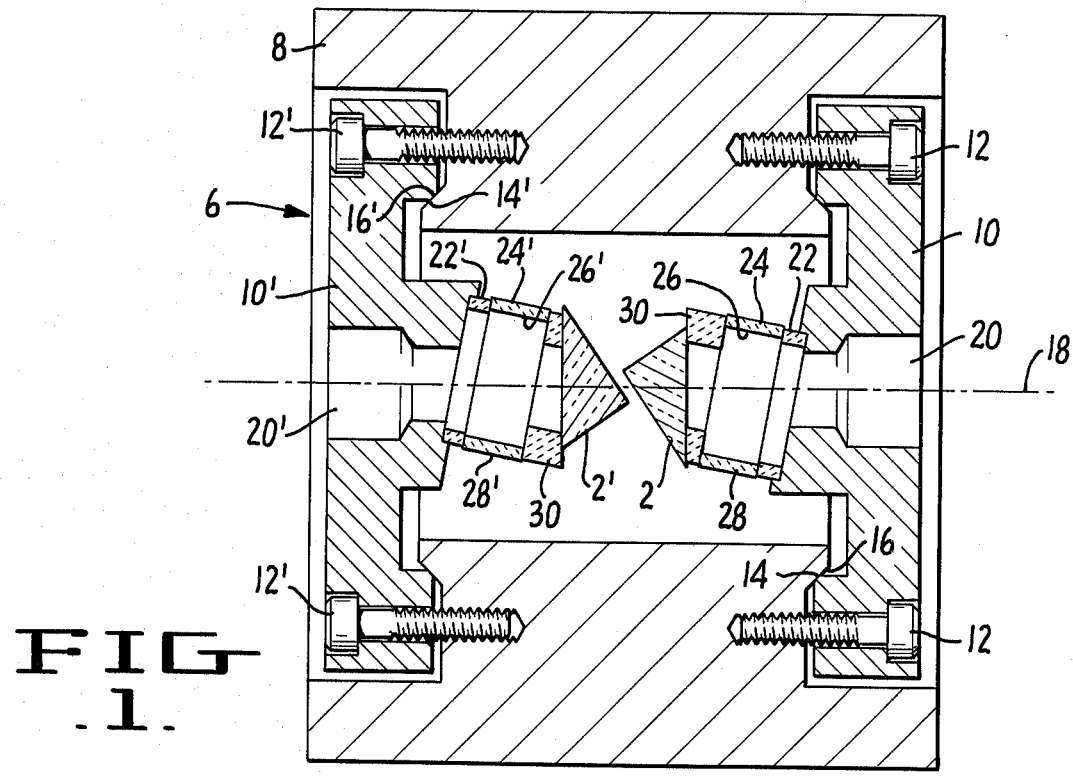
FIG. 1 is a vertical sectional view, taken along the optical axis of the etalon of this invention, together with its associated mounting structure.

A preferred embodiment of the etalon of this invention is illustrated in its entirety in the view of section 1, which represents a vertical section taken along the axis of the etalon. The two prisms comprising this etalon are illustrated schematically on a larger scale in FIG. 2. It may be noted that the separation of the prisms and the displacement of the laser beam and its angular relationship relative to the surfaces of the prisms are greatly exaggerated for purposes of illustration.

The etalon of this embodiment, which is generally symmetrical both longitudinally and about a vertical plane through the optical axis, comprises essentially the two spaced prisms, such as Littrow prisms 2 and 2', formed of fused silica and their mounting structures, generally indicated by reference numeral 6.

The mounting structure 6 for the etalon comprises an outer housing 8 which, in operation, is supported within the laser cavity, and a pair of adjustable mounting structures for supporting each of the two prisms. Due to the longitudinal symmetry of the etalon, about a plane normal to the optical axis, the mounting structure and prism associated with the right side of the etalon will be described in detail with the substantially identical corresponding components at the left side of FIG. 1 indicated by the same reference numbers primed, e.g., 2'.

The mounting for the prism 2 includes angularly adjustable mounting plate 10 which is held in engagement with housing 8 by a plurality of adjustable mounting bolts 12 extending through the plate 10 and tapped into the housing 8. By virtue of the engagement of annular lip 14 of plate 10 with the conically sloped surface 16 of the housing 8, differential tightening and loosening of the various mounting bolts 12 may serve to adjust the angular relationship between the plate 10 and the housing 8, as may be required for optical alignment.

Generally centered along the optical axis 18 of the etalon is an optical passage 20 provided through plate 10. Generally concentric with this passage 20 and at a small angle with respect to the optical axis 18, one end of a cylindrical glass ring 22 is affixed to the plate 10. Affixed to the opposite end of the ring 22 is a cylindrical member 24 of piezo-electric material affixed by one of its ends coaxially with the glass ring 22. Electrically conductive surfaces 26 and 28 are formed, respectively, on the inner and outer surfaces of the cylindrical member 24 for attachment of electrical wires thereto, for purposes to be described below. At the opposite end of the cylindrical piezo-electric member 24 is attached one side of a wedge-shaped annular member 30 formed of fused silica having thermal characteristics similar to those of prism 2. On the opposite side of the wedge-shaped member 30 is attached the prism 2. The angle of the wedge of member 30 is selected to compensate for the angular mounting of glass ring 22 with respect to the optical axis.

Figure 2:
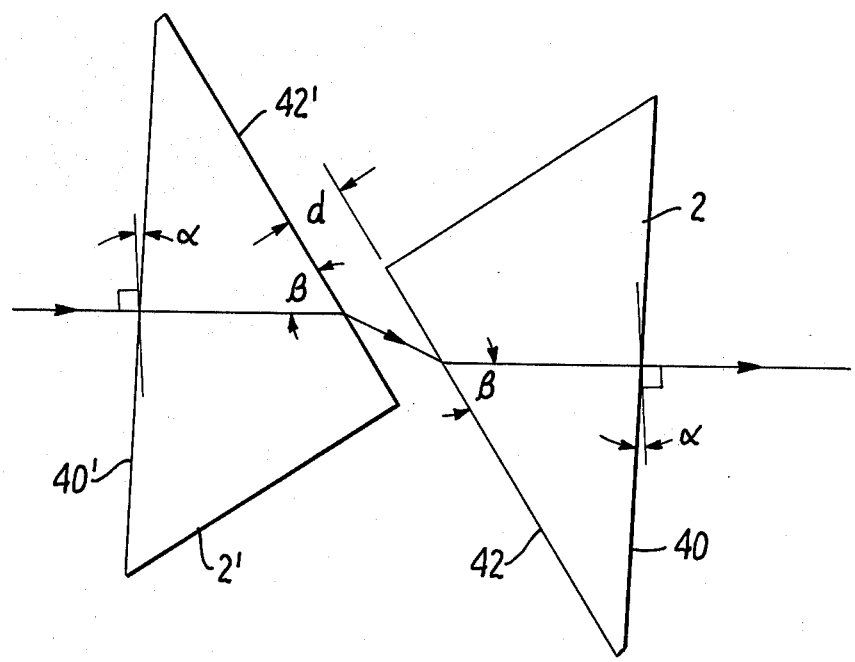
FIG. 2 illustrates schematically the general configuration and arrangement of the optical prisms of this invention.

The schematic illustration of the two prisms 2 and 2' in FIG. 2 better illustrates the relationships between the two prisms and their relationship with the optical path as will be followed by a laser beam in a cavity where such an etalon is used. Such a laser beam is illustrated as entering the etalon through prism 2' and exiting through prism 2, although obviously the beam passes through the etalon in both directions in a laser cavity. For purposes of this discussion it may be seen that the laser beam enters the etalon through outwardly facing first surface 40' of prism 2' and then exits that prism through second surface 42'. The beam then enters prism 2 through its second surface 42 and then exits that prism and the etalon through outwardly facing first surface 40 which is parallel to first surface 40'. For purposes of simplicity the second surfaces 42 and 42' of the two prisms, which face one another and are thus adjacent one another along the optical path of the laser cavity will be referred to as the "optically adjacent" surfaces. These optically adjacent surfaces 42 and 42' are spaced from one another a distance $d$, which preferably is on the order of one millimeter.

In FIG. 2, it may be seen that the outwardly facing first surface 40' of prism 2' is inclined at a slight angle $\alpha$ relative to a normal to the beam, the beam being aligned with the optical axis of the laser cavity. This angle $\alpha$ is less than 1° and is preferably on the order of a very few milliradians and desirably is just the minimum angle necessary to prevent coupling of the laser energy back into the cavity from surface 40'. Outwardly facing first surface 40 of prism 2 is similarly inclined at such an angle $\alpha$. The second surface 42' of the prism is also inclined at an angle to first surface 40' and at an angle $\beta$ with respect to the optical axis. Preferably, the angle of inclination $\beta$ of second surface 42 with respect to the laser cavity optical axis is generally equal to or at least within a few degrees of Brewster's angle for the nominal radiation wavelength of the laser. This Brewster angle cut of the prism second surfaces 42 and 42' eliminates the need for any anti-reflection coating on those surfaces and thus improves the efficiency of the system. It is desirable, however, to provide a reflective coating, such as a 20% broad band reflective coating, on the outwardly facing first surfaces 40 and 40' of the prisms.

The spacing or air gap between the surfaces 42 and 42' may be kept small, on the order of about 1 millimeter, thus minimizing any offset between the incoming beam and the outgoing beam. Further, by virtue of the entry of the beam through one surface of the prism nearly normal to that surface, its exit from another surface at Brewster's angle and the maintenance of the very small air gap between the two prisms, the system may be seen to be essentially achromatic, since this small path length in the air gap reduces the effect of any dispersion in the prism to a negligible amount.

The spacing between the two prisms may be varied to effect the selection of different wavelengths of radiation to be passed through the etalon to the output of the laser. As a result of the Brewster angle cut of the second surfaces 42 and 42' and the very small spacing between them relative to the overall thickness of the etalon, this etalon possesses substantially the same low walk-off loss characteristics as a solid etalon of comparable overall thickness. However, by virtue of the separate nature of the two prisms forming the etalon, the spacing between the two prisms and thus between the two reflective etalon surfaces 40 and 40' may readily be adjusted to "tune" the etalon.

To "tune" the etalon of this embodiment to effect the selection of different wavelengths passed by the etalon either of the prisms, or both of them, may be moved toward and away from one another. Such movement may be effected by the piezo-electric members supporting the prisms. By selective application of varying electrical potential to the contacts 26 and 28 or 26' and 28' of the piezo-electric members 24 and 24', the length of those members may be selectively varied thus moving the prisms 2 and 2' toward or away from one another. Since such piezo-electric members are capable of calibration for length differential relative to input potential, it is possible to obtain a determinable amount as well as a very fast rate of movement of the prisms to the application of such selectively adjustable potential. By varying the spacings between the two facing prisms 2 and 2', the spacing between the two reflecting etalon surfaces 40 and 40' likewise is varied, thus varying the (c/2l) resonant frequency of the etalon. By varying the resonant frequency of the etalon, selectively different frequencies or wavelengths of light are transmitted through the etalon and selective other such frequencies or wavelengths are reflected by the etalon off the laser optical axis so that the wavelength of the output radiation of the laser may be limited to axial modes within the selected transmitted wavelengths, thus controlling the output of the laser over the preselected spectral range.

The foregoing illustrates a preferred embodiment of the structure of this invention. However, since numerous variations in the structure will be readily apparent to those skilled in the art and are considered to be fully within the scope of the invention herein, the invention is not to be limited to the specific structure described but is to embrace all equivalents within the scope of the claims appended hereto.

What is claimed is:

1. In combination with a laser having a lasing medium, means for excitation of said medium and a resonant optical cavity containing said medium and having a predetermined optical axis, a Fabry-Perot etalon mounted within said laser optical cavity for selecting the wavelength of the output radiation of said laser from a plurality of discrete wavelengths closely distributed about a nominal wavelength, said etalon comprising a pair of closely spaced prisms mounted along said optical axis with the laser beam passing therethrough, each said prism having a first surface facing outwardly of said etalon parallel to the first surface of the other said prism and inclined at a slight angle to a normal to said optical axis, said prism first surfaces comprising the etalon reflecting surfaces which define the resonant frequency of said etalon, and each said prism having a second surface optically adjacent and spaced from the second surface of the other said prism, each said second surface being inclined relative to its respective first surface, whereby the etalon may possess the low walk-off loss characteristics of a thick, solid etalon while having the capability of readily adjustable spacing between the etalon reflecting surfaces to facilitate tuning of the etalon.

2. The combination of claim 1 wherein each said prism second surface is inclined at an angle with respect to said cavity optical axis that is generally equal to Brewster's angle for said laser nominal radiation wavelength.

3. The combination of claim 1 wherein said angle of inclination of said prism first surface is of the order of a few milliradians.

4. The combination of claim 1 further comprising a partially reflective coating on each said prism first surface.

5. The combination of claim 1 further comprising means for selectively changing the wavelength of said laser output radiation from one of said plurality of discrete wavelengths to another of said plurality of discrete wavelengths.

6. The combination of claim 5 wherein said output radiation wavelength changing means comprises means for selectively changing the optical path length through said etalon.

7. The combination of claim 6 wherein said etalon optical path length changing means comprises means for selectively changing the spacing between said prisms.

8. The combination of claim 7 wherein said prism spacing changing means comprises a member of piezoelectric material extending generally longitudinally of said optical cavity and to which one of said prisms is mounted, the length of said piezo-electric member varying upon the application of a varying electrical potential thereto, said piezo-electric member including means for connecting a selectively adjustable source of electrical potential thereto, whereby adjustment over a preselected range of a potential applied to the piezo-electric member serves to change the length of that member and thus the spacing between the prism mounted thereto and the other prism, thus changing the spacing between the etalon resonant reflecting surfaces and thereby causing the etalon to reflect selectively different wavelengths of the beam off the cavity optical axis such that the wavelength of the output radiation of the laser may be controlled over a preselected spectral range.

9. In combination with a laser having a lasing medium, means for excitation of said medium and a resonant optical cavity containing said medium and having a predetermined optical axis, an adjustable Fabry-Perot etalon mounted within said laser optical cavity for tuning the wavelength of the output radiation of said laser over a range of discrete wavelengths closely distributed about a nominal wavelength of such laser, said etalon comprising a pair of spaced prisms mounted along said optical axis with the laser beam passing therethrough along a predetermined optical path, each said prism having a first surface facing outwardly of said etalon along said optical axis, said first surfaces being generally parallel to one another and inclined at an angle of not more than a few milliradians to a normal to said optical axis, said prism first surfaces comprising the etalon reflecting surfaces which define the resonant frqeuency of said etalon, and each said prism having a second surface optically adjacent and spaced from said second surface of the other said prism, each said second surface being inclined at an angle relative to said optical axis that is approximately equal to Brewster's angle for said nominal wavelength, and a selectively adjustable mount for at least one of said prisms for selectively changing the spacing between said prisms, said mount including a member of piezo-electric material extending generally longitudinally of said optical cavity and to which one of said prisms is mounted, the length of said piezo-electric member varying upon the application of a varying electrical potential thereto, said piezo-electric member including means for connecting a selectively adjustable source of electrical potential thereto, whereby adjustment over a preselected range of a potential applied to the piezo-electric member serves to change the length of that member and thus the spacing between the prism mounted thereto and the other prism, thus changing the spacing between the etalon reflecting surfaces and thereby causing the etalon to reflect selectively different wavelengths of the beam off the cavity optical axis, such that the wavelength of the output radiation of the laser may be controlled over a preselected spectral range.

* * * * *